Figure 1:
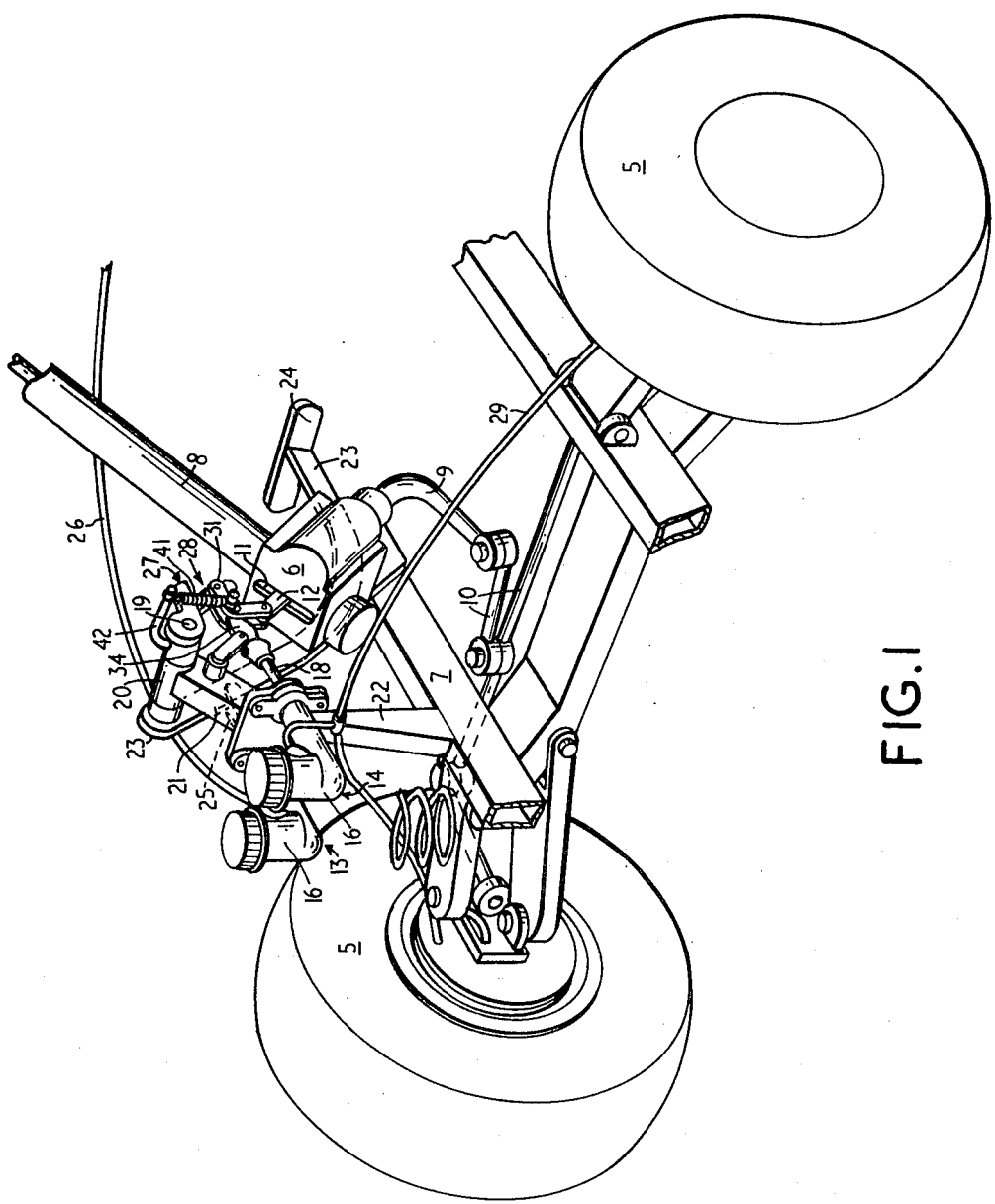

United States Patent

Ferguson et al.

[15] 3,706,352
[45] Dec. 19, 1972

[54] AUTOMATIC BRAKE-SAFETY CONTROL

[72] Inventors: Colin Campbell Ferguson, 8 Russell Street; William Robert Fossey Bolton, 1 Cox Street, P.O. Box 279, both of Toowoomba, Queensland 4350, Australia

[22] Filed: Jan. 20, 1971

[21] Appl. No.: 107,890

[52] U.S. Cl..................180/103, 188/192, 303/21 A, 303/22 R
[51] Int. Cl. ..............................................B60k 33/02
[58] Field of Search ................180/103, 82; 188/192; 303/21 A

[56] References Cited

UNITED STATES PATENTS

| | | | |
|---|---|---|---|
| 2,980,197 | 4/1961 | Breig et al. | 180/103 |
| 1,164,109 | 12/1915 | Manly | 180/103 |
| 2,877,795 | 3/1959 | Cocklin | 180/82 X |
| 3,220,189 | 11/1965 | Caramanna | 188/345 X |

Primary Examiner—Benjamin Hersh
Assistant Examiner—John P. Silverstrim
Attorney—Kimmel, Crowell & Weaver

[57] ABSTRACT

A braking system for motor vehicles includes first means for applying substantially the same braking effect to the front and rear wheels at substantially the same time when the vehicle is moving in a straight line and second means for reducing the braking effect on the front wheels compared with that on the rear wheels when the front wheels are turned, the reduction being approximately in proportion to the degree of turn of the front wheels.

2 Claims, 3 Drawing Figures

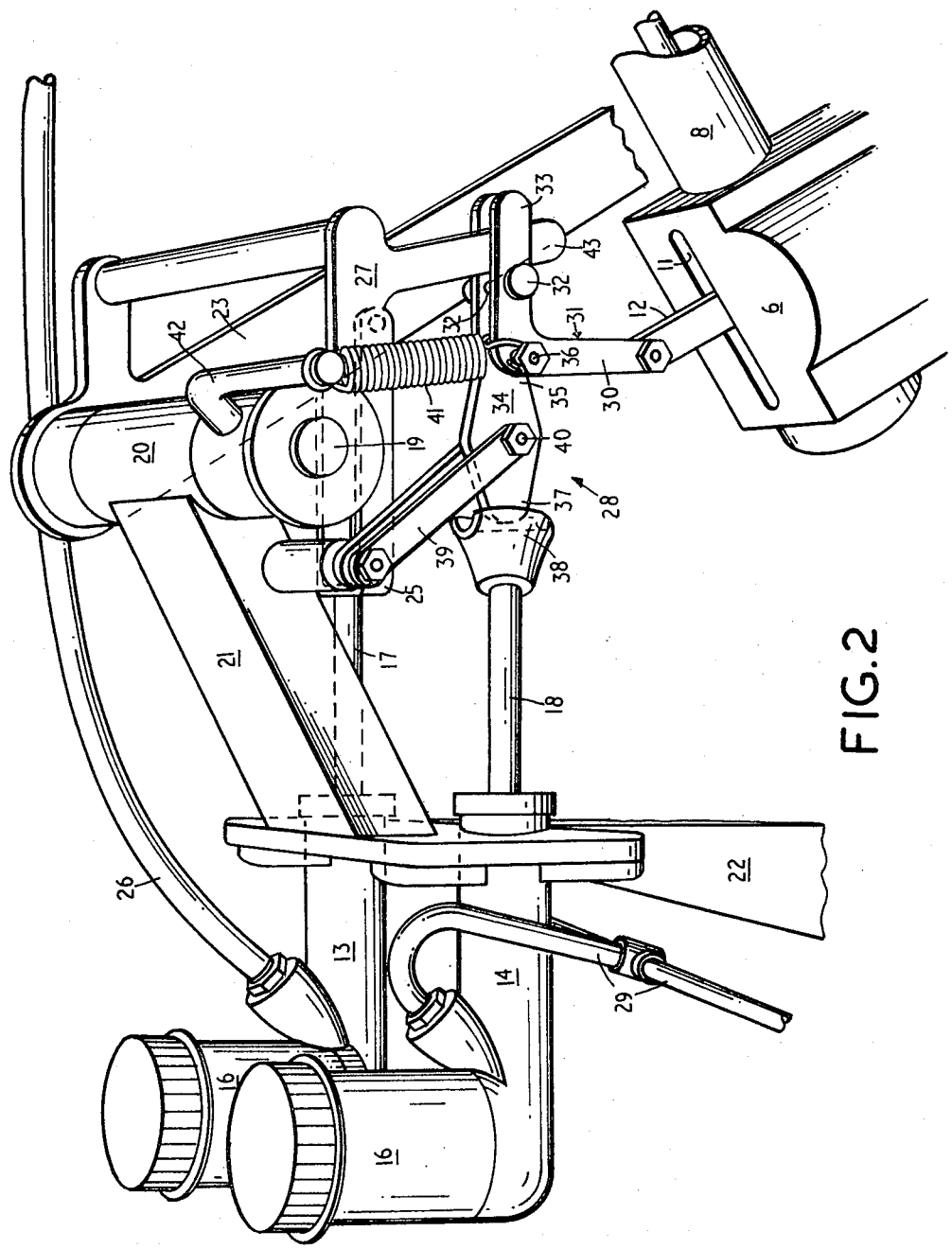

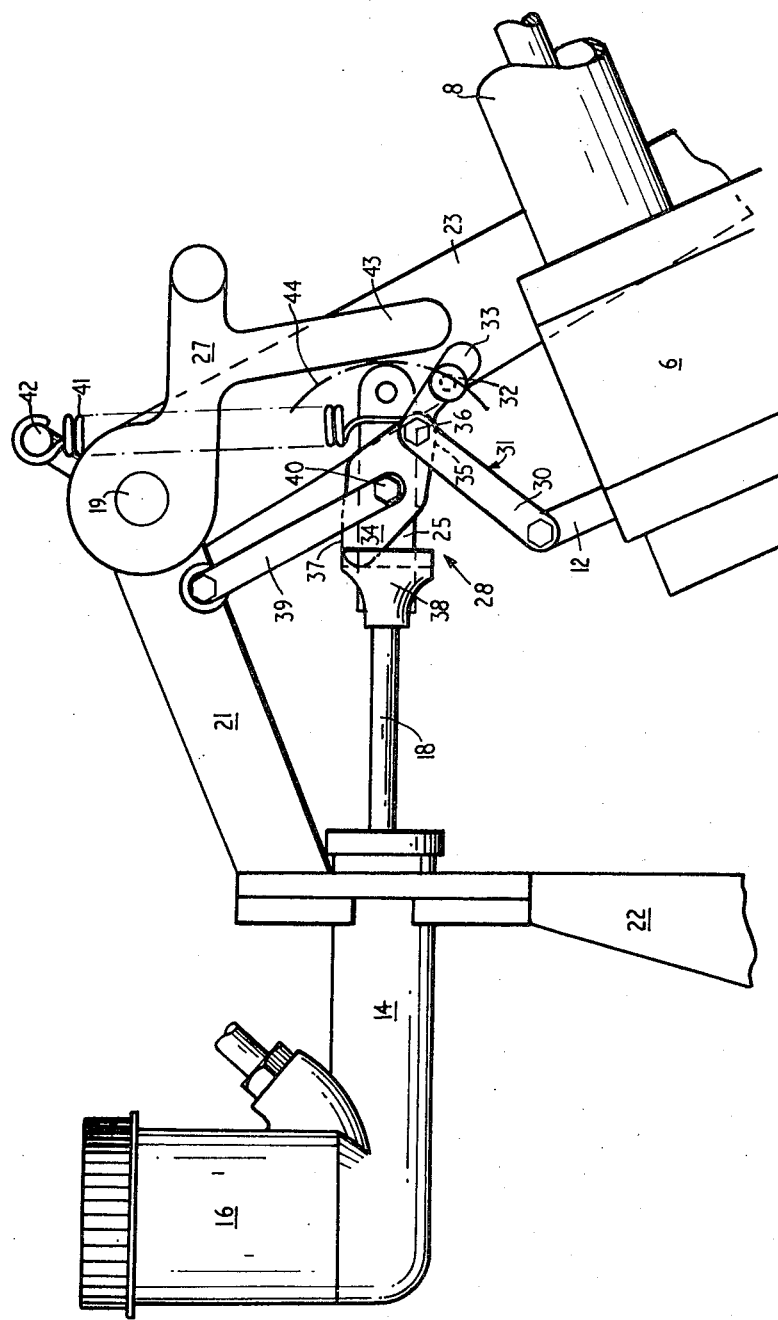

AUTOMATIC BRAKE-SAFETY CONTROL

This invention is designed to increase the safety of automobiles by regulating the pressure of the brakes on the front wheels according to the angle of the front wheels to the vehicle's direction of travel.

In the nineteen seventies the automobile industry is faced more with the safety factor than any other in automobile production. It is the elimination of driving hazards, which heretofore have not been recognized as hazards because they are not obvious, which must be the prime consideration of automobile manufacturers.

Every hour of every day a report states that a driver and his passengers were killed or injured when the car he was driving failed to make a turn in the road and rolled over, or the car skidded on a turn and hit a tree, or other obstacle, and was wrecked.

Accidents resulting from the loss of steering when the front wheels are turned are most commonly attributed to excessive speed when turning, but the speed is only partially the cause. One of the main causes of losing steering control of a car when turning is the partial or full-locking of the front wheels when full braking is applied as an emergency on the front wheels as well as the back wheels. The greater the angle of the front wheels to the car's travelling direction the greater the danger from brake pressure on the front wheels which prevents them running freely, and so increases the tendency to lock or partially lock, skid at an angle to the true direction of the car, and, at an acute angle, to roll over.

The purpose of this invention is substantially to overcome locking, or partial locking of the front wheels when turning by controlling the brake pressure on the front wheels by way of an automatic control of the braking fluid, or other means.

It is to be understood that the means to be used to control the brake pressure on the front wheels are not to be restrictively interpreted. Further experimentation may prove that the brake pressure on one front wheel should be slightly less than the other when making a left or right hand turn. It is a matter of applying the optimum pressure for each front wheel for all angles and speeds of travel for a given stock car.

In the case of a car driven from the front wheels this factor of brake-pressure-control on the front wheels can become even more important, but, naturally, would require exhaustive experimentation.

The invention in a general form is a braking system including first means for applying substantially the same braking effect to the front and rear wheels at substantially the same time when the vehicle is moving in a straight line and second means for reducing the braking effect on the front wheels compared with that on the rear wheels when the front wheels are turned, the reduction being approximately in proportion to the degree of turn of the front wheels.

One practical embodiment of the invention is illustrated in the accompanying drawings in which:

FIG. 1 is a fragmentary perspective view of the front end of a typical vehicle showing the brake pressure regulating mechanism installed therein, FIG. 2 is an enlarged perspective view of the pressure regulating mechanism in the neutral or front wheels straight ahead position; and, FIG. 3 is a side elevation of the mechanism shown in the front wheels on full lock position.

FIG. 1 shows the front suspension 4 of a typical vehicle with steerable road wheels 5. A modified steering box 6 is secured to the chassis 7 and is operated through a steering column 8 in usual fashion to control the angle of the road wheels 5 through a crank 9 and track rods 10. A slot 11 is provided in the top of the steering box 6 through which an indexing arm 12 projects. When the road wheels 5 are in the straight ahead position (as in FIGS. 1 and 2) the indexing arm 12 is positioned medially within the slot 11. When the road wheels 5 are angled to one side or the other the arm 12 moves towards one or the other extremity of the slot 11 (as shown in FIG. 3).

A pair of hydraulic master cylinders 13 and 14 with integral hydraulic fluid reservoirs 16, are mounted in tandem on the chassis 7 adjacent the steering box 6, so that their piston rods 17 and 18 extend horizontally towards the arm 12 on the steering box.

A transverse cross head shaft 19 is rotatably mounted in a bearing 20 on an extension 21 of the bracket 22 holding the said master cylinders. A cranked lever 23, carrying the brake pedal 24, is secured to one end of the shaft 19. The piston rod 17 of the master cylinder 13 is directly attached, by means of a fork 25, to the brake lever 23. This master cylinder 13 actuates the rear wheel brakes only (not shown) by means of a conduit 26. A bell crank 27, secured to the other end of the shaft 19 is adapted to operate the other master cylinder 14 through linkage 28. This master cylinder 14 actuates the front wheel brakes only through a conduit 29.

The linkage 28 will now be described. One arm 30 of a secondary bell crank lever 31 is pivotally secured to the end of the indexing arm 12. A striker pin 32 is secured to the other arm 33. One end 35 of a flat cam plate 34 is pivoted at 36 to the mid point of the lever 31. The other end 37 of the plate 35 engages a shrouded cap 38 secured to the end of the piston rod 18 associated with the front wheel master cylinder 14. Supporting links 39 extend from the bracket extension 21 and pivotally engage with the center of the plate 34 at 40. A tension spring 41, anchored to an arm 42 extending from the bearing housing 20, engages the pivot pin 36 and thus provides a force urging the bell crank 31 in an upward direction.

When the road wheels 5 are in the straight ahead position, as shown in FIGS. 1 and 2, the arm 43 of the bell crank 27 engages the pin 32 in the secondary crank 31. The crank arm 33, the plate 34 and the piston rod 18 are all in line and movement of the brake lever 23 will thus cause both piston rods 17 and 18 to be forced into the master cylinders 13 and 14 in unison so that the braking effect is applied to both front and rear road wheels to the same degree.

As the road wheels 5 are angled towards one or the other lock, the arm 12 will rotate the secondary bell crank 31 about its pivot point 36 (as shown in FIG. 3). The striker pin 32 in the arm 33 will be displaced about a circular locus 44 as shown in FIG. 3. It will be seen that as the pin 32 is displaced an increasing amount of lost movement is produced with respect to the arm 43 and pin 32. Movement of the brake lever 23 will therefore produce smaller and smaller displacement of the front wheel master cylinder piston 18 as the angling of the road wheels 5 increases. The braking effect on said front wheels 5 is thus diminished in proportion to the degree to which they are angularly displaced by the steering linkage 10.

What I claim is:

1. A braking system including first means for applying substantially the same braking effect to the front and rear wheels at substantially the same time when the vehicle is moving in a straight line and second means for reducing the braking effect on the front wheels compared with that on the rear wheels when the front wheels are turned, the reduction being approximately in proportion to the degree of turn of the front wheels wherein the first means include a first hydraulic master cylinder for the back wheels, a second hydraulic master cylinder for the front wheels, a piston displaceable in each cylinder, the braking effect being approximately proportional to the piston displacement, and third means operable by the brake operating means for displacing the pistons, the second means comprising fourth means for reducing the effect of said third means in displacing the piston in the second cylinder approximately in proportion to the degree of turn of the front wheels.

2. A braking system as in claim 1 wherein the third means includes a first member coupled to the piston of the first cylinder and adapted on operative displacement of the brake operating means to displace that piston independently of the degree of turn of the front wheels, and the fourth means includes an elongated linkage having a variable effective length, adapted at one end to engage the piston of the second cylinder continuously and adapted at its other end to be engaged by the brake operating means, there being lost motion on operative displacement of the brake operating means between the brake operating means and the linkage when the front wheels are turned, the amount of the lost motion being approximately proportional to the degree of turn.

* * * * *